United States Patent [19]
Fujino et al.

[11] Patent Number: 5,636,102
[45] Date of Patent: Jun. 3, 1997

[54] PORTABLE INFORMATION PROCESSING APPARATUS WITH HINGE FOR ENLARGED LCD DISPLAY

[75] Inventors: Takane Fujino, Atsugi; Yoshifumi Natsuyama, Yamato; Yoshiharu Uchiyama, Isehara; Tomoyuki Takahashi, Fujisawa, all of Japan

[73] Assignee: International Business Machines Corporation, Armonk, N.Y.

[21] Appl. No.: 690,514

[22] Filed: Jul. 31, 1996

[30] Foreign Application Priority Data

Sep. 21, 1995 [JP] Japan ..................... 7-243323

[51] Int. Cl.⁶ ................... G06F 1/16; H05K 7/16
[52] U.S. Cl. ................... 361/681; 362/31
[58] Field of Search ................ 361/680–683; 16/342; 362/31, 26; 364/708.1; G06F 1/16

[56] References Cited

U.S. PATENT DOCUMENTS

| | | | |
|---|---|---|---|
| 5,211,463 | 5/1993 | Kalmanash | 362/26 |
| 5,231,734 | 8/1993 | Rude | 16/342 |
| 5,509,176 | 4/1996 | Karl | 16/342 |
| 5,566,048 | 10/1996 | Esterberg et al. | 361/681 |
| 5,574,252 | 11/1996 | Hill | 361/681 |
| 5,581,440 | 12/1996 | Toedter | 361/683 |

*Primary Examiner*—Leo P. Picard
*Assistant Examiner*—Lynn D. Feild
*Attorney, Agent, or Firm*—Daniel E. McConnell

[57] ABSTRACT

A portable information processing apparatus which has a main body having front and rear edge, and a lid pivotally attached to said rear edge of said main body. The lid has an LCD unit having a liquid crystal and a light conducting plate for guiding light through the LCDI to the front surface of the LCD unit, and a cover that extends over the rear face of the LCD unit. A thinner portion is provided at one edge of the light conducting plate than the opposite edge, with the thinner portion being positioned close to the rear edge of the main body. A hinge pivotally attaching the lid to the main body at the rear edge portion has a torque plate wound around a shaft of the hinge to support the lid and is mounted in a space defined by the cover and the thinner portion of the light conducting plate.

1 Claim, 7 Drawing Sheets

PORTABLE INFORMATION PROCESSING APPARATUS WITH HINGE FOR ENLARGED LCD DISPLAY

BACKGROUND OF THE INVENTION

The present invention relates to a portable information processing apparatus that includes a main body and a lid that is so attached to the main body that it can be freely opened and closed.

Currently, so-called notebook personal computers, which are one type of portable information processing apparatus, have come to be widely used because of their portability. The background will now be explained by using a notebook personal computer as an example.

A notebook personal computer includes a main body and a lid that is so attached to the main body that it can be freely opened and closed. A keyboard is provided on the top face of the main body for inputting data. The lid includes an LCD unit for displaying the data that are inputted at the keyboard, and a cover on the back face of the LCD unit.

FIG. 6 illustrates a lid 100 of the a conventional notebook personal computer. An LCD unit 104 with a rectangular cross section is retained in a rear cover 102 of the lid 100. A gap 106 is defined between a side wall 102A, which is near the center of the rotation of the rear cover 102, and side edge of the LCD unit 104 opposite to the side wall 102A. Hinges 108 of a torque plate pressure type are provided in the gap 106. These hinges 108 couple the cover 100 with the main body so that the cover 100 can be freely opened and closed.

FIG. 7 is a perspective view of the hinge 108 shown in FIG. 6. As is shown in FIG. 7, the hinge 108 has a crank-shaped attachment piece 110 that is fixed to the main body, and an L-shaped attachment piece 112 that is fixed to the rear cover 102 of the lid 100. The attachment pieces 110 and 112 are coupled together by a shaft 114 which is fixed to the distal end of an arm 112A of the attachment piece 112, so that both pieces are relatively rotatable.

More specifically, a seating disk 118, which has a protrusion 116 at a predetermined position on its circumference, is integrally formed with the shaft 114 passing through its center. A support 110A, whose distal end is formed in a ring shape, projects upward from the attachment piece 110 and is inserted at the position adjacent to the seating disk 118. A hook-shaped stopper 120 that can engage the protrusion 116 is integrally formed with the external surface of the distal end of the support 110A. A notch 122 is formed in a predetermined position at the distal end of the support 110A. A torque ring 124 is provided adjacent to the support 110A. A hook-shaped pawl 126 is integrally formed at a specific position on the circumference of the torque ring 124, so that the torque ring 124 engages the notch 122 with the pawl 126. A wave washer 128 and a presser ring 130 are assembled adjacent to the torque ring 124 in the named order, and are secured. In short, the hinge 108 is the type that generates torque by friction.

With the above arrangement, when the lid 100 is opened and closed, the one attachment piece 112 rotates relative to the other attachment piece 110, and the wave washer 128 rotates on the face of the torque ring 124. When the lid 100 is opened, a torque generated by the friction between the wave washer 128 and the torque ring 124 ensures the lid 100 being held at any desired angle.

The size known as A4 is a popular size for a notebook personal computer. Although the conventional LCD panel of the notebook personal computer is commonly 10.4 inches and can be easily included in the size A4 footprint, recently there has been a tendency to increase the size of the LCD. The employment of a larger panel, say a 12-inch LCD panel, has also been discussed and recommended. As the LCD panel becomes larger, however, it occupies more space inside the lid, so that the room for accommodating other components, such as hinges for coupling the lid with the main computer body, is accordingly reduced. In this case, the above described hinge structure may be accepted, but problems arise.

Since the hinges 108 are a torque plate pressure type, the maximum torque is limited by the diameter of the torque plate 124, which cannot be greater than that which can be accommodated in the rear cover 102. Because the hinges 108 generate torque in proportion to the length in the direction of the shaft diameter, the diameter of the shaft 114 can't be excessively reduced. If torque plate pressure hinges that are narrower than the current hinges 108 are employed, they can not produce the torque (on the order of 60 kg or greater) required to hold a lid with a heavy 12-inch LCD unit at any desired angle. If the hinge of the type like the hinge 108 is to be employed at a venture, the lid must be thickened or the foot print of the lid must be expanded to provide sufficient room for accommodating the hinges. This, however, degrades the features of the notebook personal computer, that is its compact size and its excellent portability.

SUMMARY OF THE INVENTION

With the foregoing difficulty in mind, it is one purpose of the present invention to provide a portable information processing apparatus that can hold a lid at any opening angle without increasing the size of the apparatus.

BRIEF DESCRIPTION OF THE DRAWINGS

One purpose of the invention having been stated, others will appear as the description proceeds, when taken in connection with the accompanying drawings, in which.

DESCRIPTION OF THE PREFERRED EMBODIMENT(S)

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of the invention. Accordingly, the description which follows is to be understood as being a broad, teaching disclosure directed to persons of skill in the appropriate arts, and not as limiting upon the present invention.

According to the present invention, a portable information processing apparatus which has a main body having front and rear edge, and a lid pivotally attached to said rear edge of said main body, the lid including an LCD unit having a liquid crystal and a light conducting plate for guiding light through the LCDI to the front surface of the LCD unit, and a cover that extends over the rear face of the LCD unit, also has a thinner portion provided at one end of the light conducting plate than the other end, the thinner portion being positioned close to a rear edge of the main body; and at least one hinge for pivotally attaching the lid to the main body at the rear edge portion, the hinge having a torque plate wound around a shaft of the hinge to support the lid and being accommodated in a space defined by the cover and the thinner portion of the light conducting plate.

In this structure, the hinges for rotatably coupling the lid with the main body are so provided by winding a torque plate around a shaft. A long shaft is so formed that its dimension is increased at the point that the torque plate is wound around (a surface where the shaft contacts the torque plate). Then, greater friction can be generated than that which is obtained with conventional torque plate pressing hinges. This ensures that the lid can be held at any desired angle.

In addition, with this structure, the overall diameter of the shaft can be reduced and compact hinges can be provided while maintaining a maximum torque to be generated. With the lid attachment portion of the light conducting plate of the LCD so formed that it is thinner than the opposite portion, the LCD unit and the hinges can be compactly stored in the cover. Therefore, these compact hinges can be accommodated into the gap defined between the cover and the light conducting plate. As a result, the size of the apparatus will not be increased.

One embodiment of the present invention will now be explained while referring to FIGS. 1 through FIG. 5.

Figure 5:
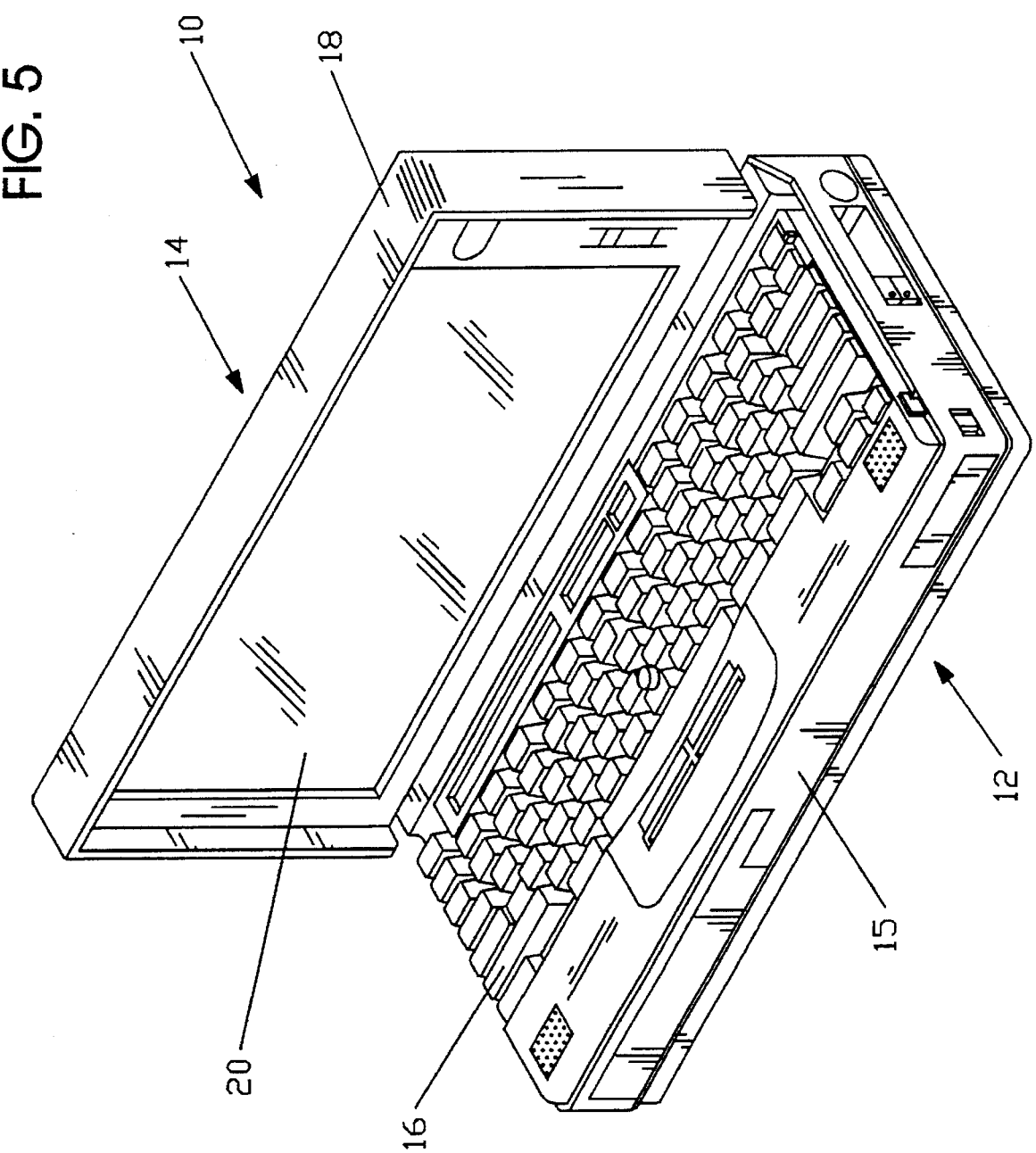
FIG. 5 is a perspective view of the exterior of the personal computer to which is attached the lid in FIG. 1.
Figure 6:
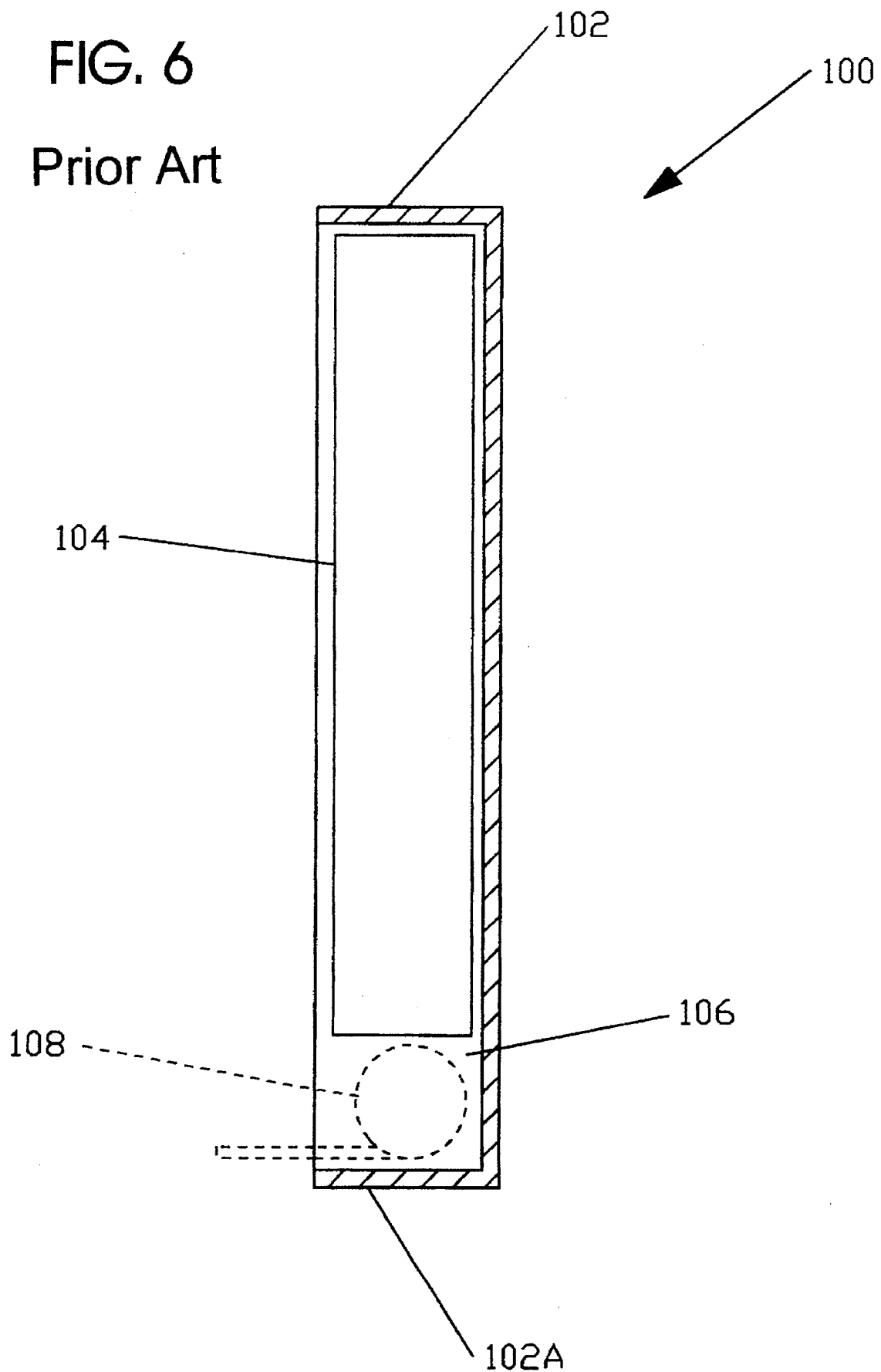
FIG. 6 is a schematic diagram, relative to FIG. 3, showing the locations of an LCD unit and hinges in a conventional personal computer.

FIG. 5 is a perspective view of the exterior of a notebook personal computer 10 according to one embodiment of the present invention when it is in use. As is shown in FIG. 5, the personal computer 10 includes a thin main body 12 and a lid 14 that is so attached to the main body 12 that it can be freely opened and closed.

The main body 12 has a shallow case 15 wherein a keyboard 16 for inputting data is retained.

The lid 14 has a shallow rear cover 18 wherein an LCD unit 20 is provided to display data that are input at the keyboard 16. The LCD unit 20 includes a liquid crystal, and a light conducting plate 22 (see FIG. 1) for conducting light over the liquid crystal. It should be noted that the personal computer 10 in this embodiment has a 12-inch display area.

Figure 1:
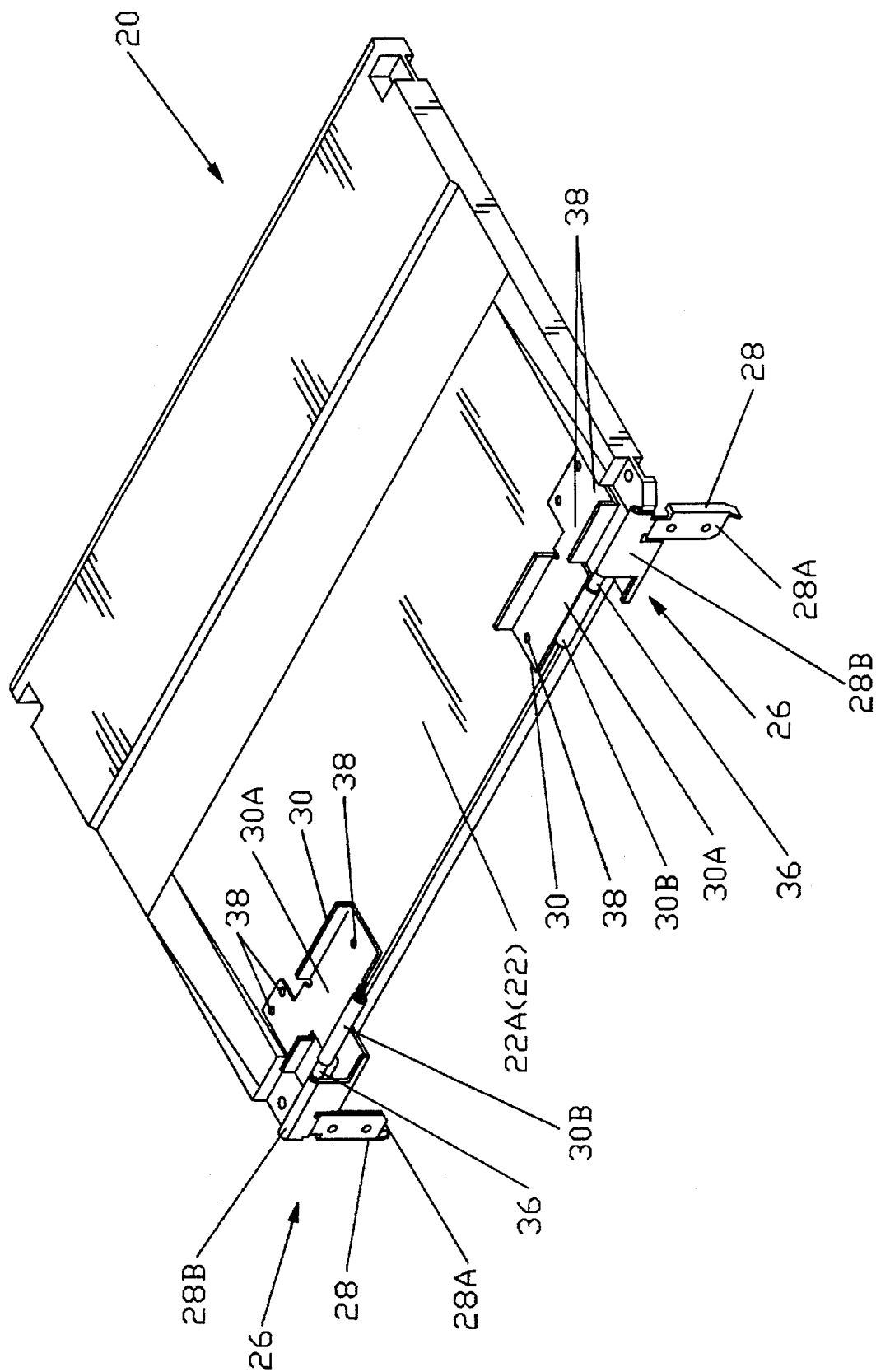
FIG. 1 is a perspective view of the rear structure of the lid of the personal computer according to one embodiment of the present invention.
Figure 2:
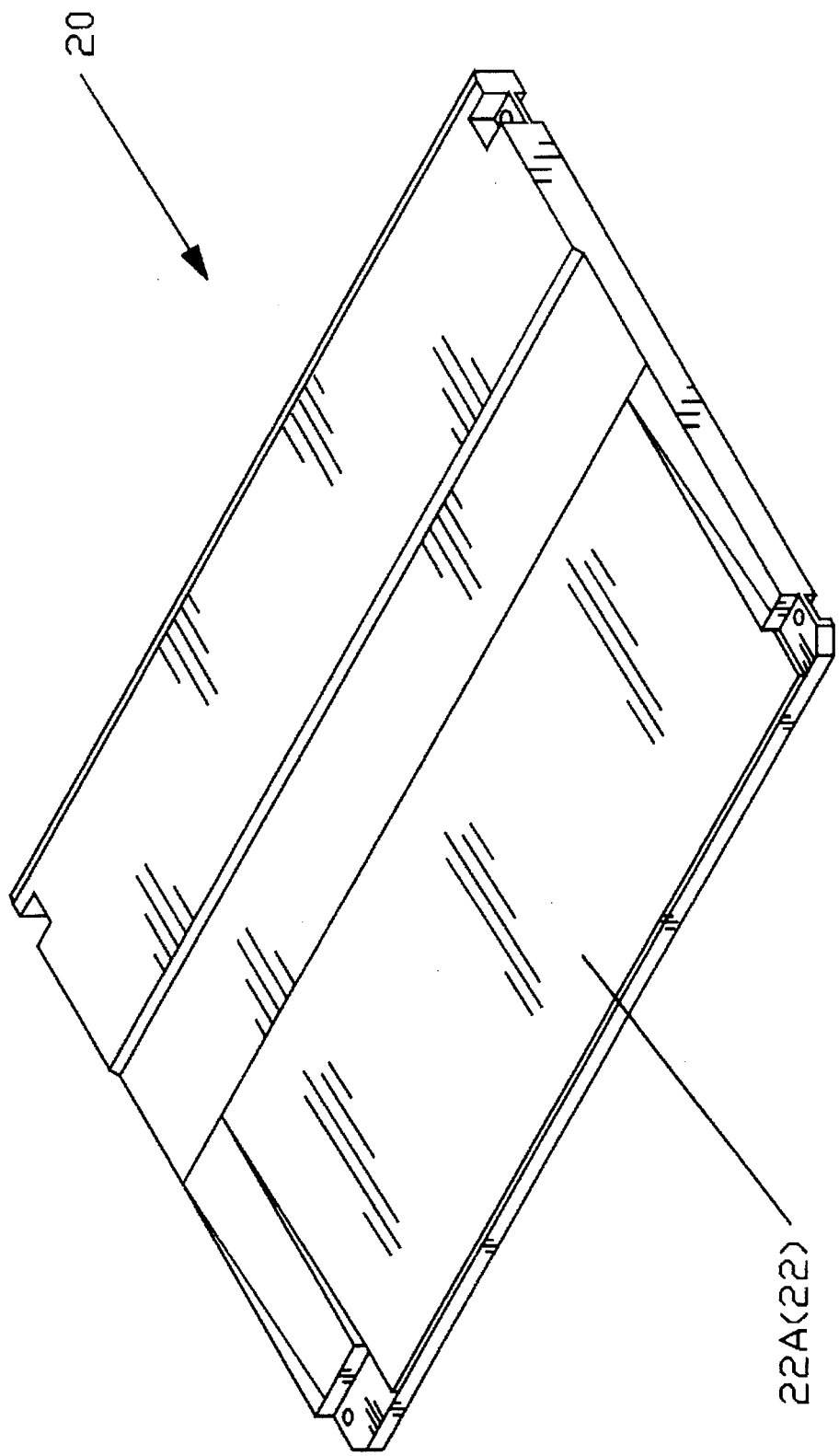
FIG. 2 is a perspective view showing the lid in FIG. 1 with the hinges removed.
Figure 3:
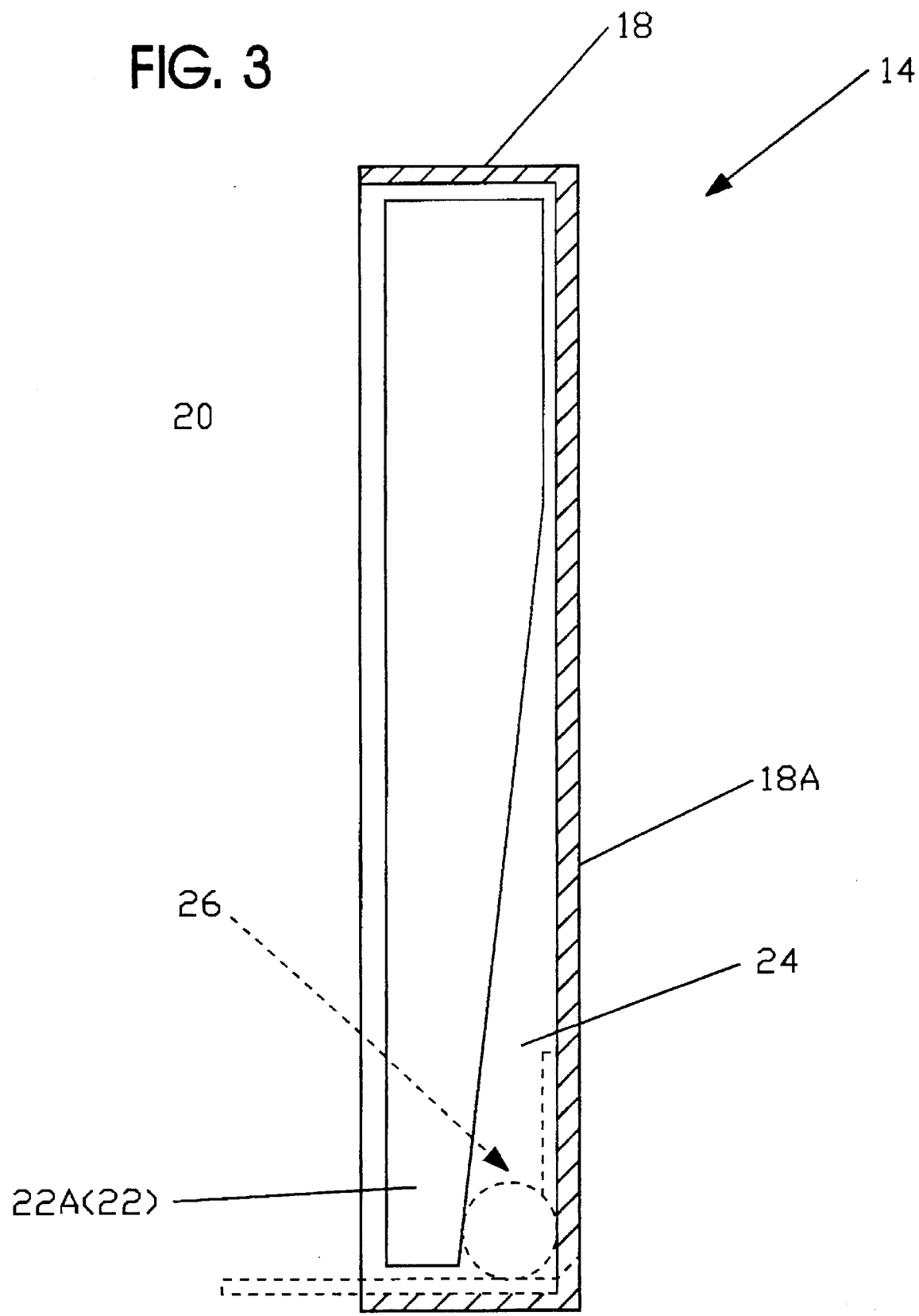
FIG. 3 is a schematic diagram illustrating the locations of the LCD unit and of hinges in the lid in FIG. 1.

As is shown in FIGS. 1 through 3, the light conducting plate 22 of the LCD unit 20 is wedge shaped, so that the hinge coupling portion is thinner than the opposite portion. The hinge coupling portion is hereafter referred to as a "thin portion 22A". A gap 24 having a triangular cross section is defined between the thin portion 22A of the LCD unit 20 and a bottom wall 18A of the rear cover 18. A pair of hinges 26 are located in the gap 24 to rotatably couple the lid 14 with the main body 12.

Figure 4:
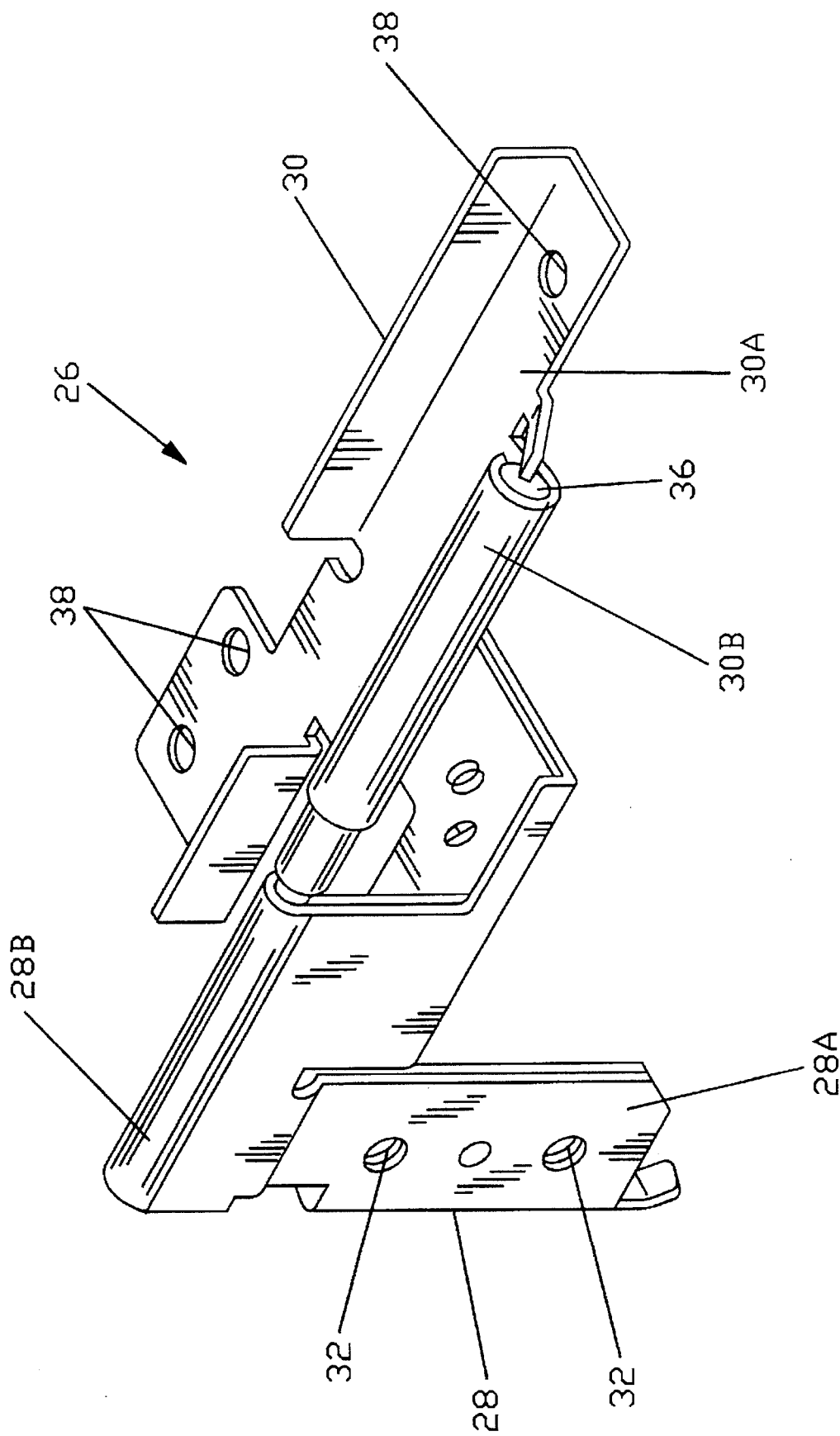
FIG. 4 is a perspective view of a single hinge in FIG. 1.

As is shown in FIG. 4, the hinges 26 each have attachment pieces 28 and 30, which are formed by bending metal plates into the specific shapes. The attachment piece 28 has a double plate structure, and a pair of threaded through holes 32 are formed in a narrow fitting portion 28A that extends downward. Screws (not shown) engage the threads in these through holes 32 to fix the attachment piece 28 to the case 15 of the main body 12. A cylinder portion 28B having a long and narrow cylindrical shape is formed at the end of the attachment piece 28. A portion that extends from one end of a shaft 36 to its center in the axial direction is inserted into and secured in the cylindrical portion 28B. The shaft 36, therefore, does not rotate relative to the attachment piece 28.

The other attachment piece 30 has a single plate structure, with a plurality of through holes 38 being formed at appropriate locations in a almost flat fitting portion 30A. By engaging the through holes 38 with screws (not shown), the attachment piece 30 is fixed to the rear cover 18 of the lid 14. A long and narrow torque plate 30B is integrally formed at the end of the attachment piece 30. The torque plate 30B, which has a circular cross section, is rotatably wound around the portion of the shaft 36 that extends from its free end to its center in the axial direction.

Figure 7:
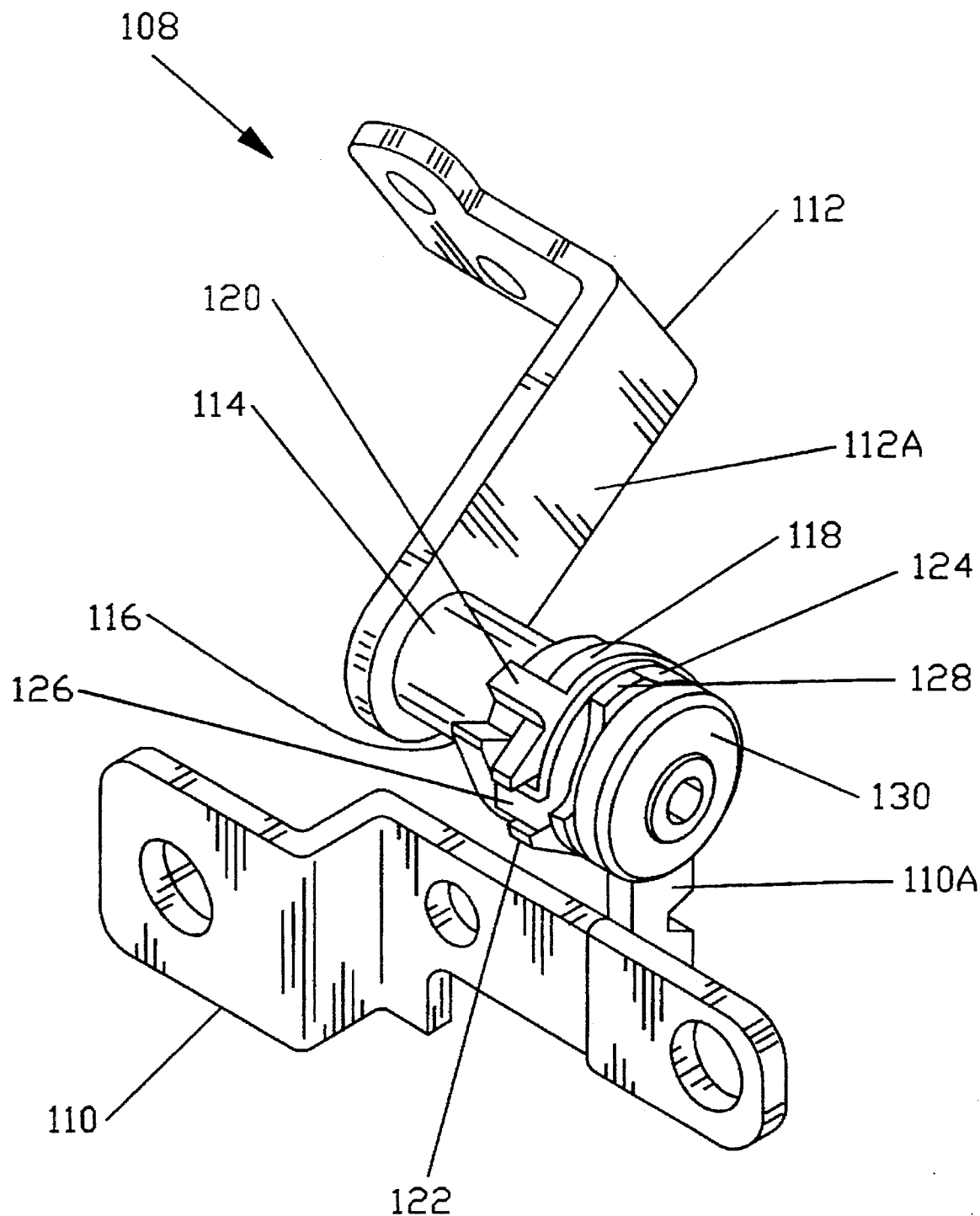
FIG. 7 is a perspective view of a single hinge in FIG. 6.

In order to generate a torque that is equivalent to or greater than that acquired by the conventional hinges 108 (see FIG. 7), the shafts 36 of the hinges 26 do not need to have large diameters. This is because friction is generated, or is acquired by portions of the hinges 26 being held in contact with the sides of the shafts 36 in the axial direction, not as a consequence of the size of the diameter of the shafts 36.

The process and the effect of the embodiment will now be described. In this embodiment, the LCD unit 20 that is installed in the lid 14 of the personal computer 10 has a 12-inch LCD panel, which is larger than a conventional 10.4-inch panel. The weight of the lid 14 is accordingly greater than that of the lid 100 of the conventional personal computer.

Let us suppose that the lid 14 is opened to a desired angle relative to the main body 12. If the conventional hinges 108 are employed, the generated torque becomes small so that the lid 14 can not be stably held at a desired angle. In this embodiment, however, since the hinges 26 are employed wherein the torque plates 30B are wound around the shafts 36, it is ensured that a larger surface of the torque plate 30B contacts the shaft 36, and that a larger torque can be generated. Therefore, the opened lid 14 can be held stably at any desired angle.

In addition, in this embodiment, as the hinges 26 are used wherein the torque plates 30B are wound around the shafts 36, the diameter of the shafts 36 can be smaller than that of the shafts 114 for the conventional hinges 108, and the hinges 26 can be made compactly.

Moreover, since in this embodiment the light conducting plate 22 of the LCD unit 20 is wedge shaped so as to define the gap 24 between the thin portion 22A of the light conducting plate 22 and the rear cover 18, the above described compact hinge 26 can be accommodated in the gap 24. That is, the LCD unit 20 and the hinge 26 can be stored within a small space in the rear cover 18. Therefore, the thickness of the lid 14 and the size of the footprint do not have to be expanded. Accordingly, the size of the personal computer 10 is not increased.

Further, although in this embodiment the light conducting plate 22 of the LCD unit 20 is wedge shaped, so as to define the gap 24 with the rear cover 18, the light conducting plate 22 of the LCD unit 20 need not necessarily have in a wedge shape, so long as at least a portion where the hinges 26 can be located is formed thinner than the opposite portion and is so provided that it overlaps the LCD unit 20. Therefore, a recessed portion having a rectangular cross section in which the hinges 26 can be located may be formed in the side section of the light conducting plate 22 nearest the rotational center of the lid.

Although the notebook personal computer 10 has been employed in this embodiment, the present invention is not limited to this type; it may be applied for any other portable information processing apparatus.

As is described above, a portable information processing apparatus according to the present invention is so designed that the lid attachment side portion of the light conducting plate is formed thinner than the portion on the opposite side, and the hinges, each of which have a torque plate wound around the shaft, coupling the lid with the main body are accommodated into the gap defined by the lid attachment portion and the cover. Therefore, an excellent effect can be obtained whereby the lid can be securely held at any desired angle without increasing the size of the apparatus.

In the drawings and specifications there has been set forth a preferred embodiment of the invention and, although specific terms are used, the description thus given uses terminology in a generic and descriptive sense only and not for purposes of limitation.

What is claimed is:

1. A portable information processing apparatus comprising:

(1) a main body having a front edge and a rear edge;

(2) a lid having a front edge and a rear edge and a cover;

(3) an LCD unit mounted in said lid and having a liquid crystal and a light conducting plate for guiding light through said liquid crystal to the front face of said LCD unit;

said light conducting plate having a thinner portion provided at one edge thereof than the opposite edge thereof, said thinner portion being positioned adjacent said rear edge of said lid;

said cover and said thinner portion of said light conducting plate together defining a space within said lid; and (4) a hinge pivotally attaching said rear edge of said lid to said rear edge of said main body, said hinge having an elongate shaft disposed with the longitudinal axis thereof extending parallel to said rear edge of said lid and a torque plate wound around said shaft to support said lid, said shaft extending between, and being accommodated in said space defined by, said cover and said thinner portion of said light conducting plate.

* * * * *